(12) United States Patent
Pasternak

(10) Patent No.: US 8,864,068 B1
(45) Date of Patent: Oct. 21, 2014

(54) MULTI-CHAMBER LANDING SYSTEM FOR AN AIR VEHICLE

(75) Inventor: Igor Pasternak, Los Angeles, CA (US)

(73) Assignee: Worldwide Aeros Corporation, Montebello, CA (US)

( * ) Notice: Subject to any disclaimer, the term of this patent is extended or adjusted under 35 U.S.C. 154(b) by 226 days.

(21) Appl. No.: 13/437,805

(22) Filed: Apr. 2, 2012

(51) Int. Cl.
  *B64C 25/56* (2006.01)
(52) U.S. Cl.
  USPC ............... 244/100 A; 244/100 R; 244/101; 244/105; 244/5; 180/164
(58) Field of Classification Search
  CPC ........... B64C 25/00; B64C 25/56; B60V 3/08
  USPC .......... 244/5, 17.17, 100 A, 100 R, 101, 105; 180/124, 125, 127, 128, 164
  See application file for complete search history.

(56) References Cited

U.S. PATENT DOCUMENTS

| | | |
|---|---|---|
| 2,465,193 A | 12/1944 | Boyle |
| 2,463,351 A | 3/1949 | Bowers |
| 2,522,340 A | 9/1950 | Braden et al. |
| 2,621,874 A | 12/1952 | Boyle |
| 3,013,747 A | 12/1961 | Grihangne et al. |
| 3,154,270 A | 10/1964 | Jensen |
| 3,507,466 A | 4/1970 | La Fleur |
| 3,981,462 A * | 9/1976 | Berezhnoi et al. ........ 244/100 A |
| 6,880,783 B2 | 4/2005 | Munk |
| 7,040,572 B2 | 5/2006 | Munk |
| 2005/0082426 A1* | 4/2005 | Munk ....................... 244/100 A |
| 2010/0140388 A1* | 6/2010 | London et al. .................... 244/5 |
| 2010/0230533 A1 | 9/2010 | Greiner |

\* cited by examiner

*Primary Examiner* — Philip J Bonzell
*Assistant Examiner* — Nicholas McFall
(74) *Attorney, Agent, or Firm* — Cislo & Thomas LLP

(57) ABSTRACT

A landing system for an air vehicle with vertical takeoff and landing capability is provided that comprises a set of selectively pressurizeable upper and lower air chambers surrounded by a connecting curtain assembly. The upper and lower air chambers are each continuous having elongated right and left cylindrical center sections interconnected by semicircular sections at each end. The landing system is connected to the air vehicle by a catenary system connected to the upper air chamber. The landing system can adjust pressure in each individual set of landing chambers such that the attitude of the vehicle can be adjusted to clear uneven ground or assist with loading and offloading. The system is capable of absorbing energy during vertical landings. After landing, the system is capable of providing suction between the air vehicle and the ground to stabilize the air vehicle.

21 Claims, 12 Drawing Sheets

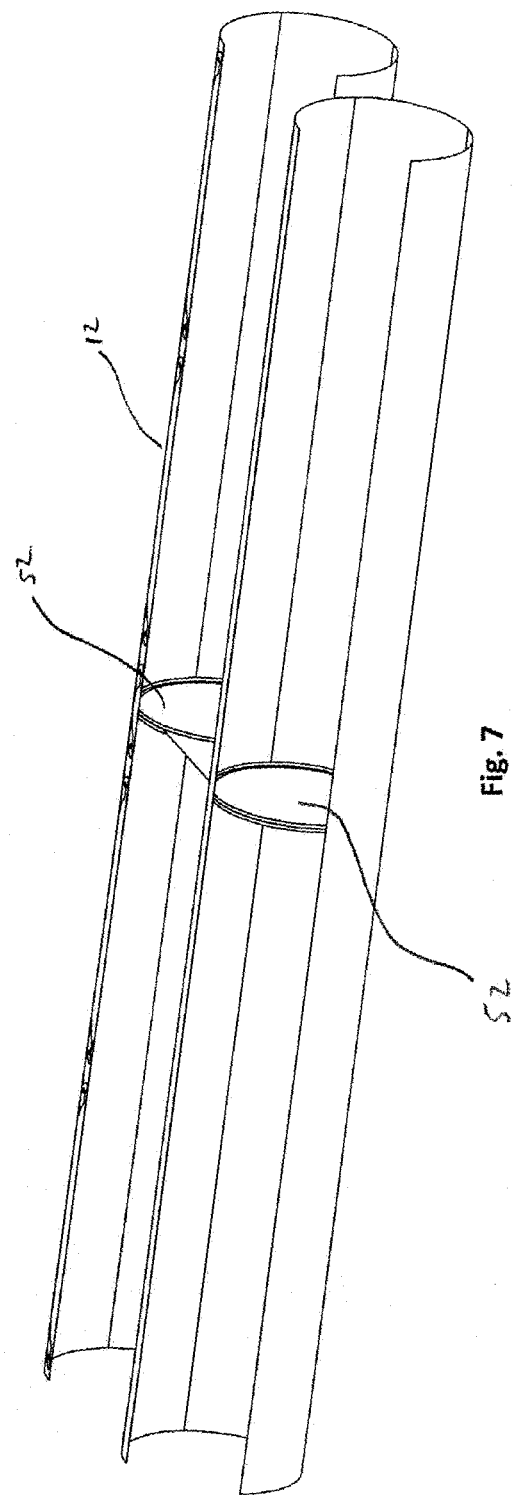

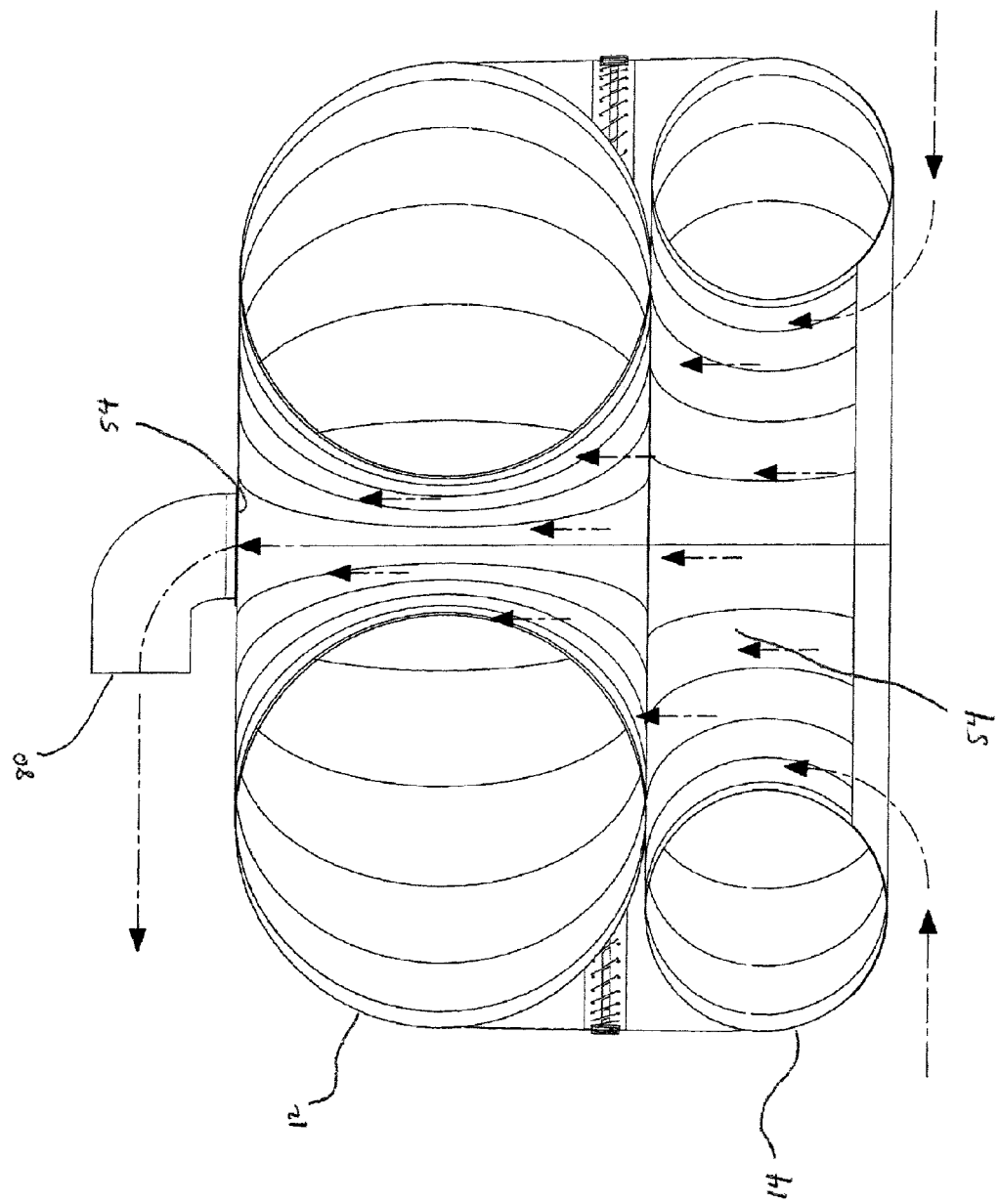

MULTI-CHAMBER LANDING SYSTEM FOR AN AIR VEHICLE

FIELD OF THE INVENTION

The invention relates generally to air cushioned landing systems for flight vehicles and more particularly to a multi-chamber landing system for use with an air vehicle.

BACKGROUND OF THE INVENTION

Air cushioned landing systems have previously been proposed for air vehicles. These prior art systems were designed for rolling takeoff and landing following the principals of a hovercraft by allowing the vehicle to accelerate during take-off and decrease speed during landing. However, the prior art systems are of limited utility for large vertical takeoff and landing vehicles because they are not weight efficient and suffer from an inability to absorb and redistribute energy during takeoff and landing. Vertical takeoff and landing flight vehicles have specific requirements for a landing system. The landing system should actively absorb energy during vertical impact. The system should also provide suction to increase the vehicle's stability while on the ground and reduce friction while the vehicle is taxiing. Finally, the system should have the ability to adjust the attitude of the vehicle to enable the vehicle to clear uneven ground and other obstacles while taxiing and to assist with the loading and offloading of cargo. Prior art landing systems for flight vehicles do not meet these requirements.

Therefore, there remains a need in the art for and an improved air cushion landing system that addresses the above deficiencies and is particularly well suited for use on an air vehicle designed for vertical takeoff and landings.

SUMMARY OF THE INVENTION

The landing system of the present invention solves the problems of the prior art by providing an air cushion landing system that comprises a set of selectively pressurizeable upper and lower air chambers surrounded by a connecting curtain assembly. The upper and lower air chambers are each continuous having elongated right and left cylindrical center sections interconnected by semicircular sections at each end. The air chambers may also take the shape of an elongated torus. The landing system is connected to the air vehicle by a catenary system connected to the upper air chamber. Typically, the landing system will include a series of sets of landing chambers.

The upper air chamber includes a top surface which is essentially sealed with an air impermeable barrier and the upper and lower air chambers are otherwise configured such that there is a space or third chamber defined by the interior walls of the air chambers and the ground when the air vehicle is in contact with the ground. The application of suction to this third air chamber allows the vehicle to adhere to the ground during cargo and/or passenger unloading. This ability is particularly important for vehicles with lighter-than-air characteristics. The application of pressurized air to the third chamber reduces ground friction allowing the air vehicle to taxi. Pressure in the upper and lower air chambers can be adjusted to absorb energy on vertical landing. When arranged sequentially, pressure can be adjusted in each individual set of landing chambers such that the attitude of the vehicle can be adjusted to clear uneven ground or assist with loading and offloading.

BRIEF DESCRIPTION OF THE DRAWINGS

FIG. 7 is a partial cutaway view of the upper air chamber of the landing system of FIG. 3 showing in an exemplary inner bulkhead.

FIG. 9b is a perspective view of the landing system of the present invention during suction, partially cutaway to reveal a third air chamber bounded by the interior walls of the upper and lower air chambers when the air vehicle is on the ground.

DETAILED DESCRIPTION OF THE PREFERRED EMBODIMENTS

Figure 1:
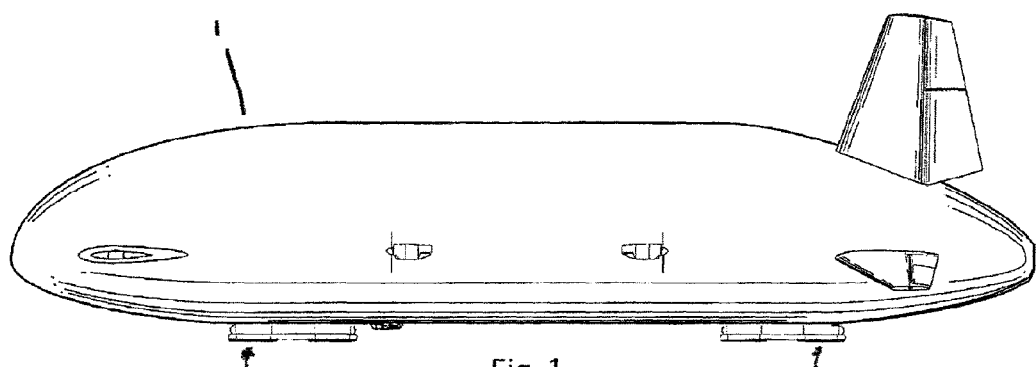
FIG. 1 is a side view of an exemplary air vehicle incorporating the landing system of the present invention.
Figure 2:
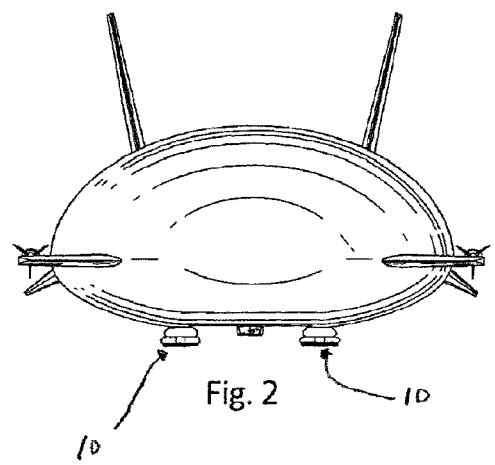
FIG. 2 is a front view of the exemplary air vehicle of FIG. 1 incorporating the landing system of the present invention.

Referring now to FIGS. 1-2, the present invention 10 is a landing system for an air vehicle 1 with vertical takeoff and landing capabilities. The landing system 10 is designed to support landing, takeoff, taxiing, and ground stability through suction. The landing system is capable of absorbing ground impact during all modes of flight and ground taxiing operations. The landing system 10 of the present invention also supports landing on rough or uneven ground conditions and provides landing surface suction while stationary in order to secure the vehicle to the ground to resist the effects of wind conditions and any increased positive buoyancy (static lift) created by the unloading of cargo and/or passengers. Typically, the landing system will include a series of sets of landing chambers distributed to equally absorb the force of the vehicle during landing.

Figure 3:
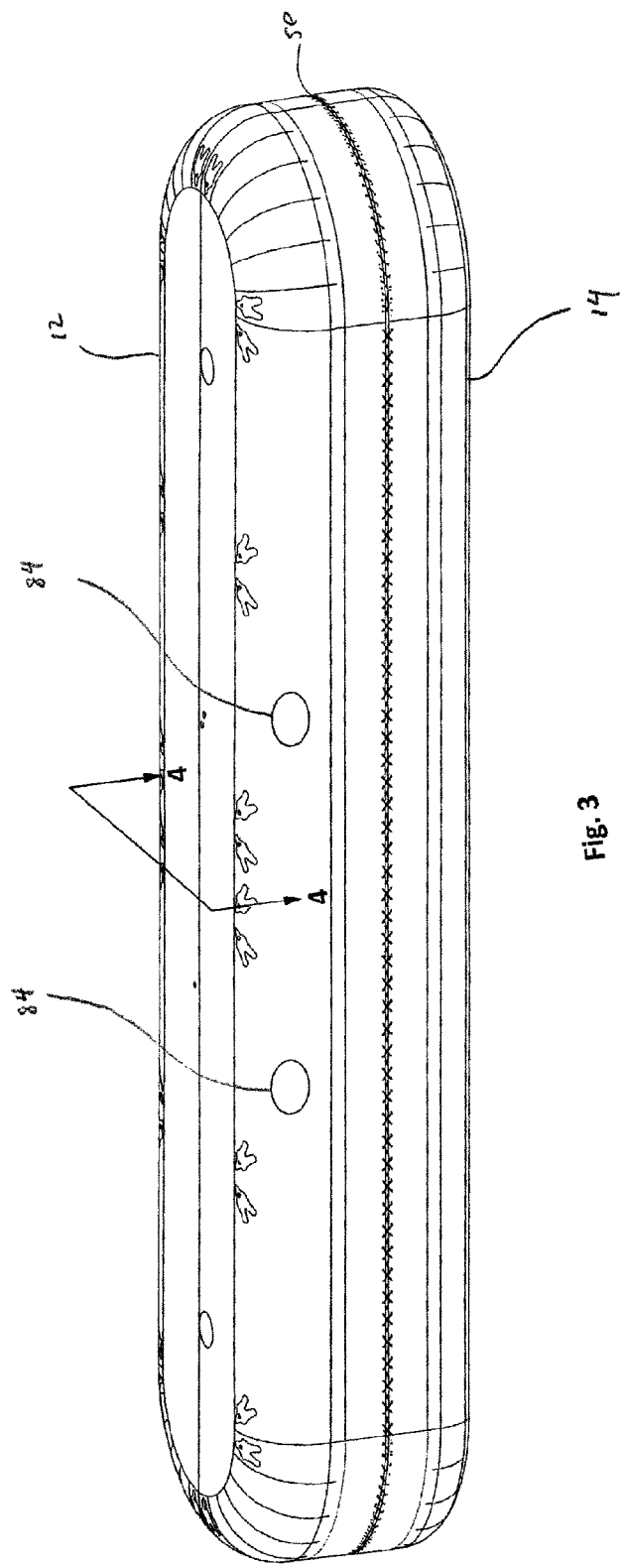
FIG. 3 is a perspective view of the landing system of the present invention.
Figure 4:
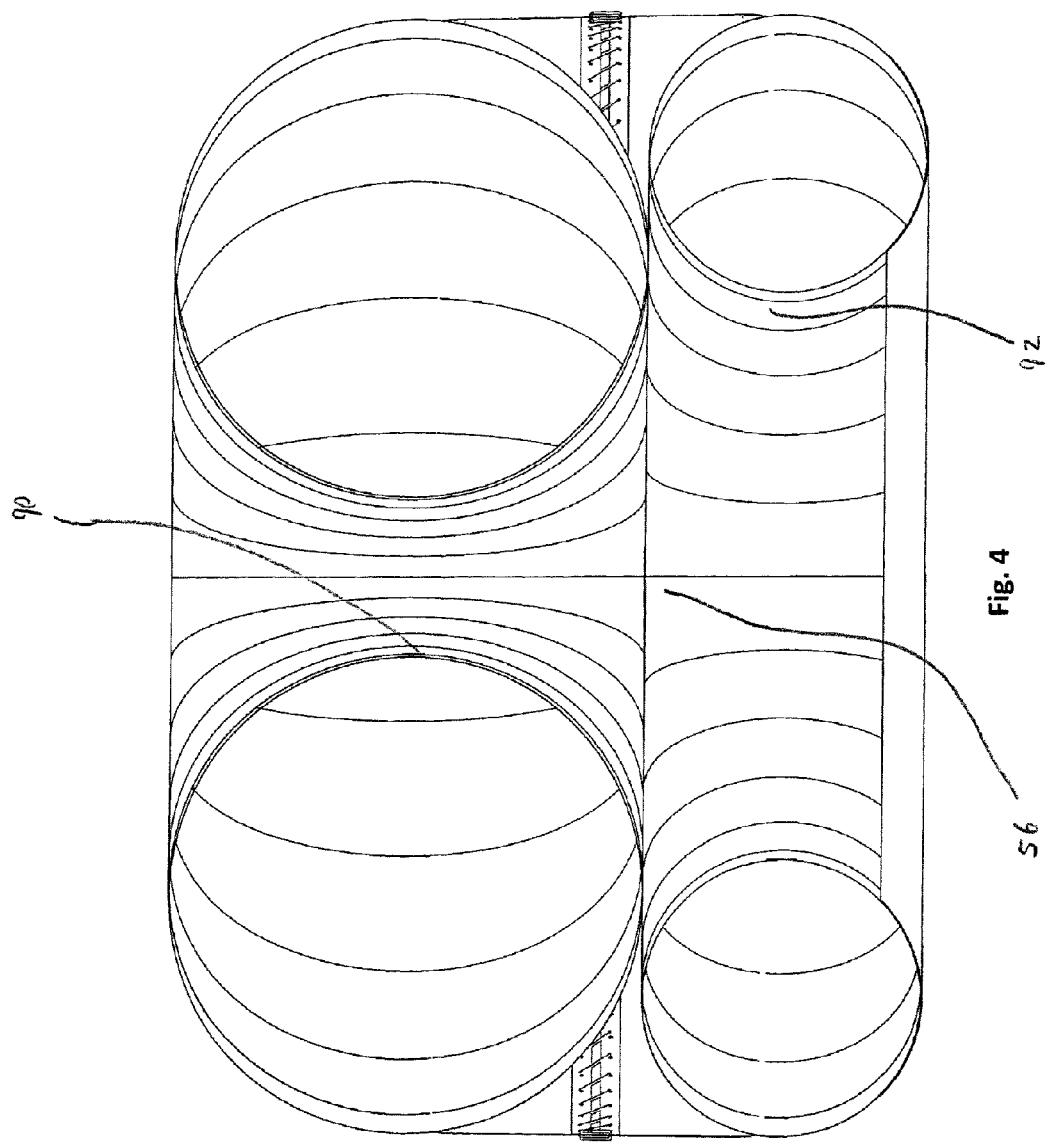
FIG. 4 is a cross sectional view of the landing system of FIG. 3 taken along the line 4-4 in FIG. 3.
Figure 5A:
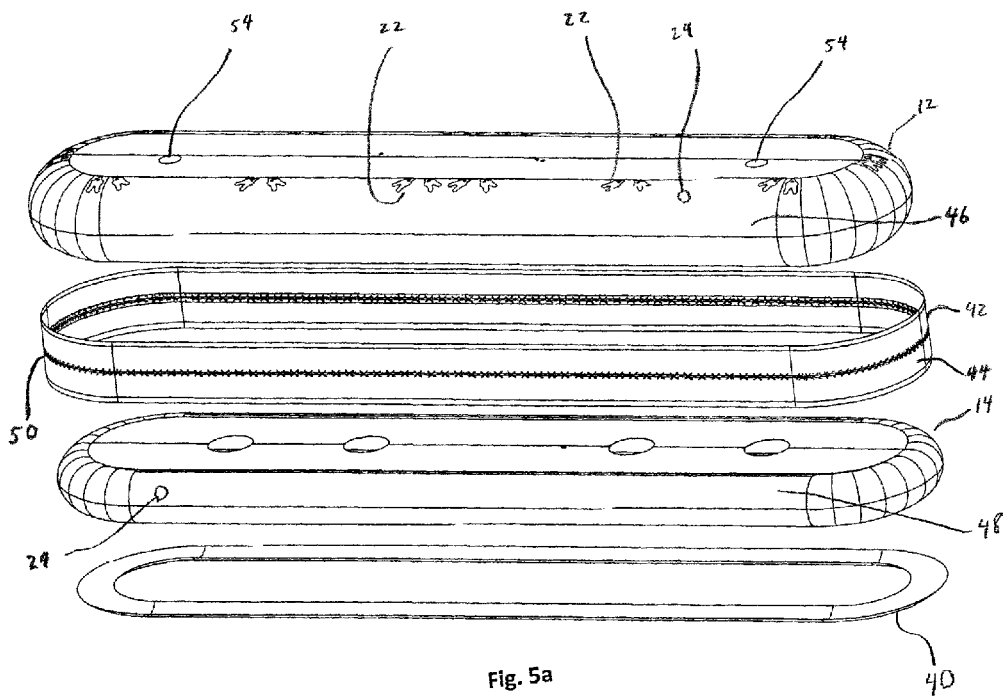
FIG. 5a is a partially exploded perspective view of the landing system of FIG. 3.
Figure 5B:
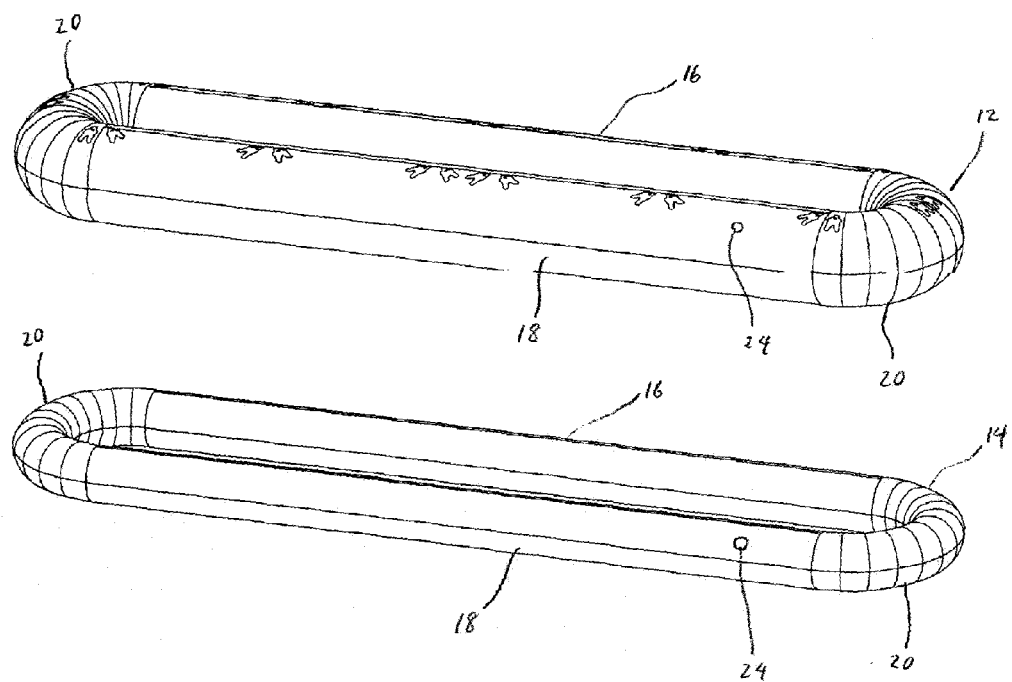
FIG. 5b is a partially exploded perspective view of the upper and lower air chambers of the landing system shown in FIG. 3.
Figure 6:
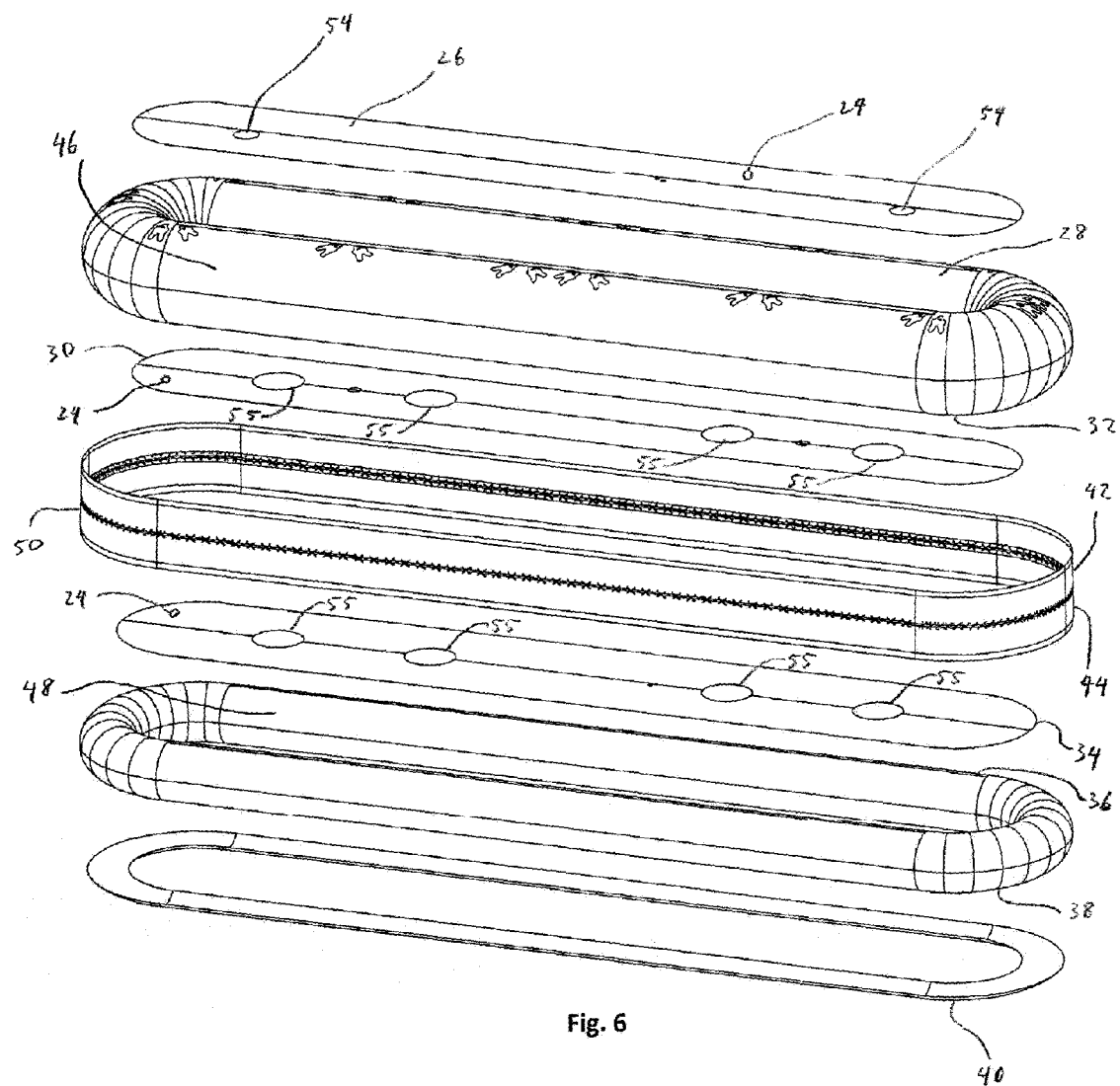
FIG. 6 is an exploded perspective view of the landing system of FIG. 3.

Referring now to FIGS. 3-6, and particularly to FIGS. 5-6, the landing system of the present invention 10 comprises a set of pressurized upper and lower air chambers 12 and 14, respectively. The air chambers 12 and 14 are load bearing and are able to absorb the ground impact upon touchdown of the vehicle and are also able to support the vehicle's weight when parked. The upper 12 and lower 14 air chambers are in the form of an elongated torus, as shown in FIG. 5b each is continuous having elongated right 16 and left 18 cylindrical center sections interconnected by semicircular sections 20 at each end. The upper chamber of the landing system 12 is connected by a catenary system attached to the air vehicle. The upper chamber has a series of patches 22 through which connectors are woven. These connecters serve as attachment points between the air vehicle and the landing system.

Both chambers are made from lightweight high density fabric 24 designed to withstand pressure and weather conditions. Suitable fabrics from which the air chambers may be constructed include any coated or laminated ultraviolet ("UV") fabric such as polyester, nylon, vectran, or other fabrics known in the art. It is desirable that the fabric be coated on both sides with a UV light blocking coating for protection from degradation caused by UV light. Suitable UV light blocking coatings for fabrics are known in the art.

Referring to FIG. 6, in addition to the upper and lower air chambers 12 and 14, the landing system of the present invention 10 includes a top cover 26. The top cover 26 is bonded to a top surface 28 of the upper chamber 12, intermediate the top surface and the under carriage of the air vehicle 1. A debris shield 30 is similarly bonded to a bottom surface 32 of the upper air chamber. Likewise, the lower air chamber 14 also includes a debris shield 34 bonded to a top surface 36 of the lower air chamber 14. When assembled, the debris shields sit one on top the other. The debris shields further include a plurality of air chamber ports 55. Thus, when fully assembled the upper and lower air chambers sit directly one on top the other with the debris shields sandwiched in-between.

The top cover 26 and debris shields 30 and 34 are made of fabric material 24, in the exemplary embodiment. It is desirable that a bottom surface 38 of the lower chamber 14 be coated with an abrasion resistant coating 40 to reduce wear on the bottom surface of the lower air chamber 14 during landings, takeoffs and taxiing maneuvers. Various polyurethane materials make suitable abrasion resistant coatings known to those of skill in the art.

With continued reference to FIGS. 3-6, an upper curtain 42 is bonded to an exterior radial surface 46 of the upper chamber 12. Likewise, a lower curtain 44 is bonded to an exterior radial surface 48 of lower air chamber 14. The upper and lower curtains 42 and 44 run continuously around the perimeter of the upper and lower air chambers 12 and 14. The curtains are interconnected by tension cords 50 to both bind the upper and lower air chambers together and allow a degree of flexing between the upper and lower air chambers so as to prevent overstressing of the chambers.

Referring to FIG. 7, the upper chamber 12 may also include one or more internal dividers 52 that divide the upper chamber into semi-independent sections. The internal dividers serve as an added safety feature. In case one section of the upper chamber ruptures, the remaining sections prevent the chamber from completely collapsing.

Referring now FIGS. 4 and 6, the upper 12 and lower 14 air chambers are elongated torus-like structures and as such when assembled there exists a space interior of the air chambers that forms a third air chamber 56 when the air vehicle is in contact with the ground. The third air chamber 56 is bounded by the interior walls of the upper and lower air chambers 90 and 92, respectively, the top cover 26 and the ground when the air vehicle is on the ground. By the use of at least one bi-directional blower assembly 80 (see FIGS. 8a and 8b) suction can be created within the third air chamber 56 which assists the air vehicle in maintaining ground contact during high wind conditions or during passenger/cargo unloading (see FIG. 9b).

Figure 9A:
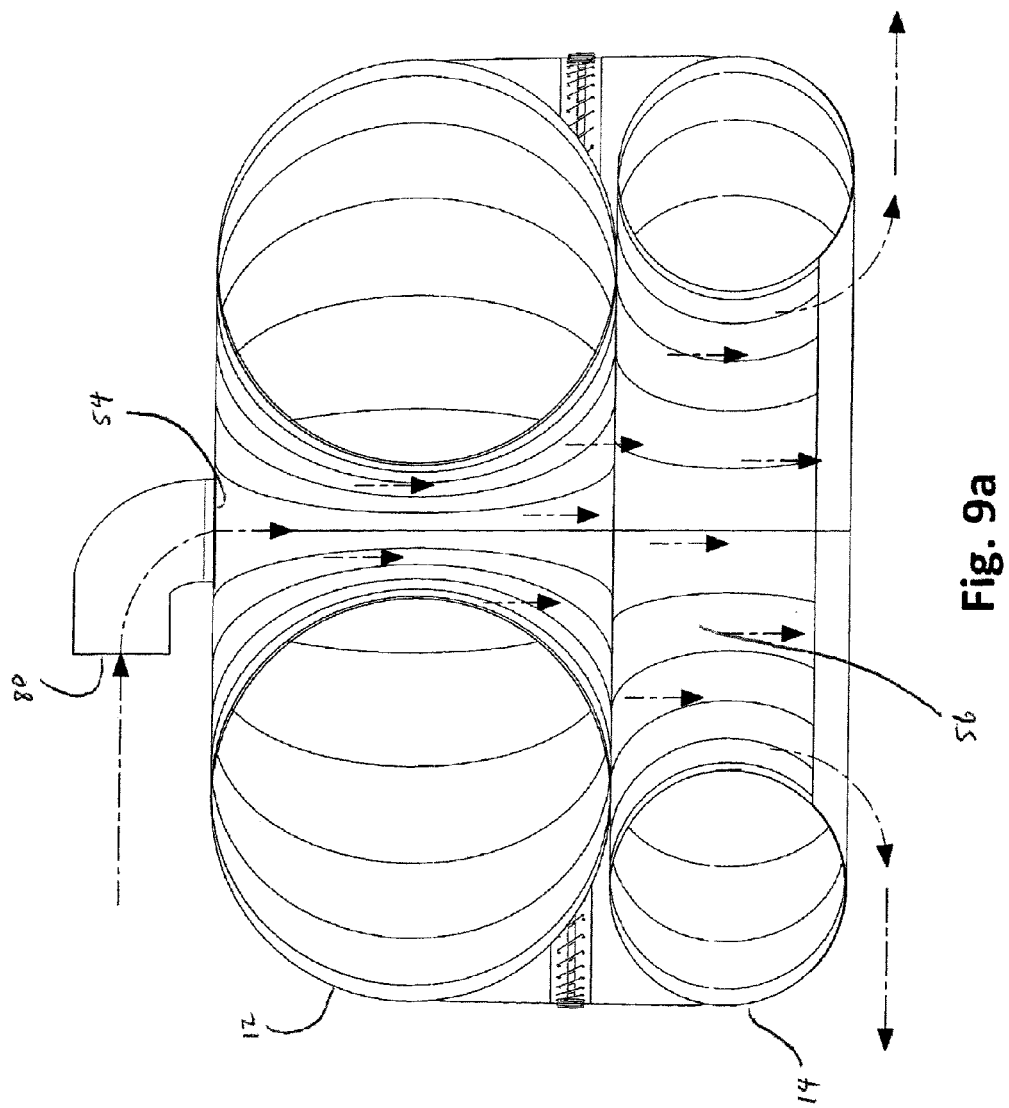
FIG. 9a is a perspective view of the landing system of the present invention during taxi, partially cutaway to reveal a third air chamber bounded by the interior walls of the upper and lower air chambers when the air vehicle is on the ground.

Similarly, when the at least one blower assembly 80 is reversed, pressurized air may be blown into the third chamber 56 to assist the air vehicle in taxiing or achieving a vertical takeoff (see FIG. 9a). The the top cover 26 of the upper chamber 12 includes one or more portholes 54 through which suction may be applied to the third chamber 56 by the at least one blower assembly 80 and likewise pressurized air can be blown into the chamber 56 by the at least one blower assembly 80. The two debris shields 30 and 34 function to filter ground debris to prevent damage to the equipment during suction.

When the air vehicle 1 is in flight, the upper and lower air chambers 12 and 14 of the landing system 10 are deflated and retracted to reduce the air vehicle's profile thereby reducing the aerodynamic drag on the vehicle. During the landing decent, the upper and lower air chambers 12 and 14 are inflated. After landing, the volume of air in the lower chamber 14 is adjusted to closely fit the ground surface. Adjusting the air volume within the lower chamber 14 allows for maximum ground contact, i.e. creates the best seal with the ground, when the bi-directional blower assembly 80 is operating in suction mode.

Air Control System

The air control system of the landing system 10 of the present invention contains two independent blower systems. The inflation and deflation blower system (FIGS. 8a and 8b) controls the inflation and deflation of the of the upper and lower air chambers 12 and 14 of the landing system 10 to allow expansion and retraction of the upper and lower air chambers 12 and 14 during takeoff and landing. A second, independent bi-directional blower system 80 controls pressurization and suction in the third air chamber 56, i.e. the space in-between the upper and lower air chambers and the ground when the air vehicle has landed.

Figure 8A:
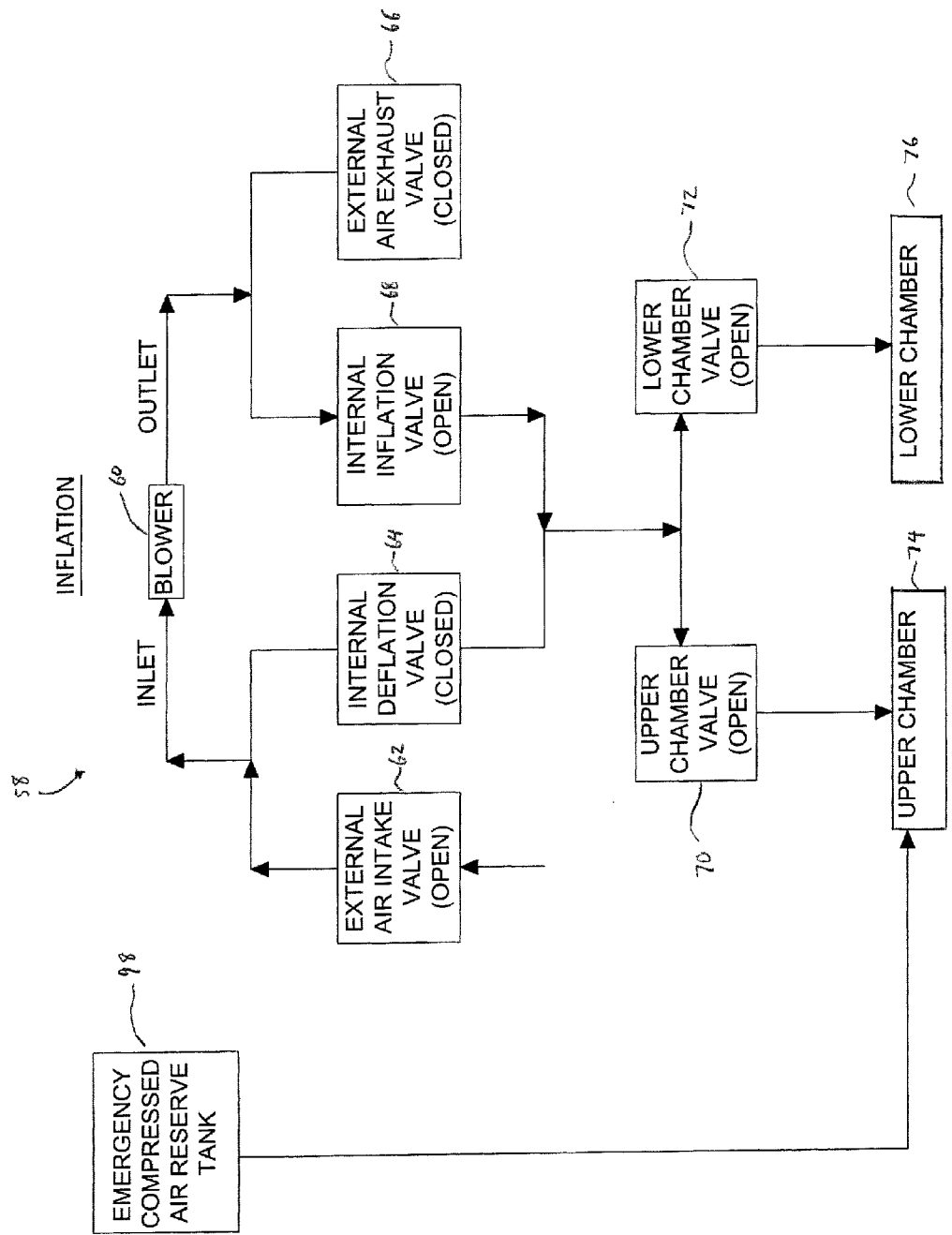
FIG. 8a is a block diagram showing the air chamber inflation system of the landing system of the present invention.
Figure 8B:
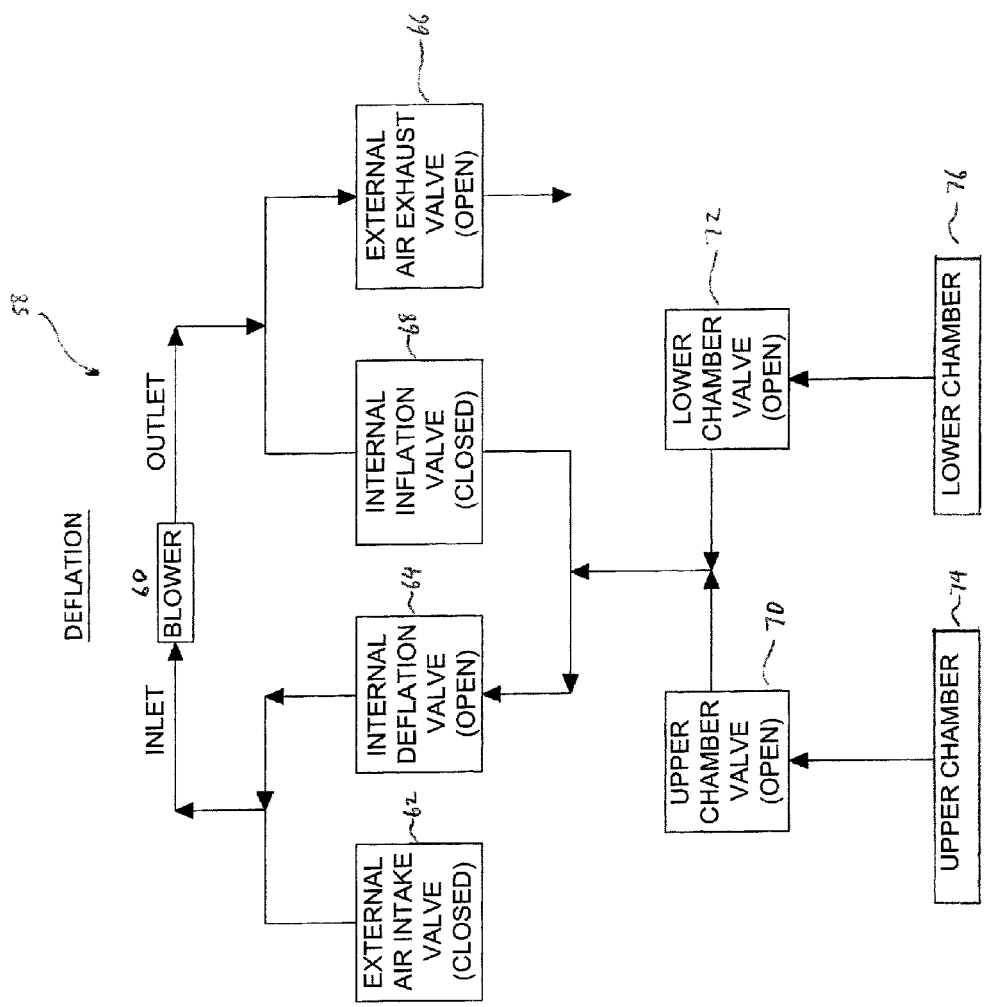
FIG. 8b is a block diagram showing the air chamber deflation system of the landing system of the present invention.

Referring to FIGS. 8a and 8b, a block diagram showing an exemplary embodiment of the air chamber inflation and deflation blower system 58 is shown. Those skilled in the art will understand that multiple blower systems maybe used depending upon the size and intended use of the air vehicle in which they are installed. The inflation and deflation blower assembly 58 comprises a motorized or engine driven blower motor 60 and a series of valves, i.e. external air intake valve 62, an internal deflation valve 64, an external air exhaust valve 66, an internal inflation valve 68, an upper chamber valve 70 and a lower chamber valve 72 that control the air direction in the system 58 and consequently allows for changes in air pressure inside the upper 12 and lower 14 air chambers. The blower 60 may be of any of several types including screw, Roots, Paxton, and piston type air pumps. In the exemplary embodiment, a twin screw pump is preferred.

The external air intake valve 62 and the external air exhaust valve 66 allow for the intake or exhaust of air from the external atmosphere. The internal deflation valve 64 and the internal inflation valve 68 control the direction of the internal air flow. The upper chamber valve 70 and lower chamber valve 72 regulate the flow of air into and out of the air chambers. The valve arrangement in the blower assembly 58 allows for a change in direction of air flow depending upon whether inflation or deflation of the upper and lower air 12 and 14 chambers is desired.

With reference to FIG. 8a, during inflation of the upper 12 and lower 14 air chambers, the external air intake valve 62 is open, the internal deflation valve 64 is closed, and the internal inflation valve 68 is open, while the external air exhaust valve 66 is closed. Both the upper chamber valve 70 and the lower chamber valve 72 are open which causes the upper 12 and lower 14 air chambers to inflate with air. Upon landing, both the upper 12 and lower 14 air chambers are fully inflated to absorb impact load caused by landing. After landing, air may be released from the lower chamber 14 via valve 72 to allow it to better form to the ground surface. Valves 70 and 72 may be open or closed independently as desired, to independently inflate or deflate the upper or lower air chambers 12 and 14.

Air inlets and outlets 74 and 76 are in fluid communication with the upper and lower air chambers 12 and 14, respectively. Means for connecting the air inlets and outlets with the upper and lower chambers are known to those of skill in the art.

With reference to FIG. 8b, during deflation, the external air intake valve 62 is closed, the internal deflation valve 64 is open, while and internal inflation valve 68 is closed, and the external air exhaust valve 66 is open. In this sequence of valve events, air is drawn from the upper and lower chambers 12 and 14 to allow for rapid deflation and retraction of the chambers.

Referring now to FIGS. 9a and 9b, at least one bidirectional air blower assembly 80 controls the internal pressure in the third air chamber 56, i.e. the interior space in-between the upper 12 and lower 14 air chambers when the vehicle is on the ground. A variety of bi-directional air blowers are known to those skilled in the art.

Referring to FIG. 9a, in friction reduction mode, i.e. taxiing, the blower assembly 80 takes in external air and forces the airflow out through the air chamber ports 55 (see FIG. 6). The pressure in the center chamber 56 is positive during the friction-reduction function, i.e. pressurized air is blown into the chamber 56 and such that the air escapes from underneath the lower air chamber 14, creating slight additional positive buoyancy. This pressurized air outflow works as an air jet which allows the vehicle to taxi or be towed. Referring now to FIG. 9b, the opposite occurs during suction operation. The selectively reversible air blower pulls air out from the air chambers thereby creating a negative pressure in the center chamber 56 between the landing system and the ground surface.

Figure 10:
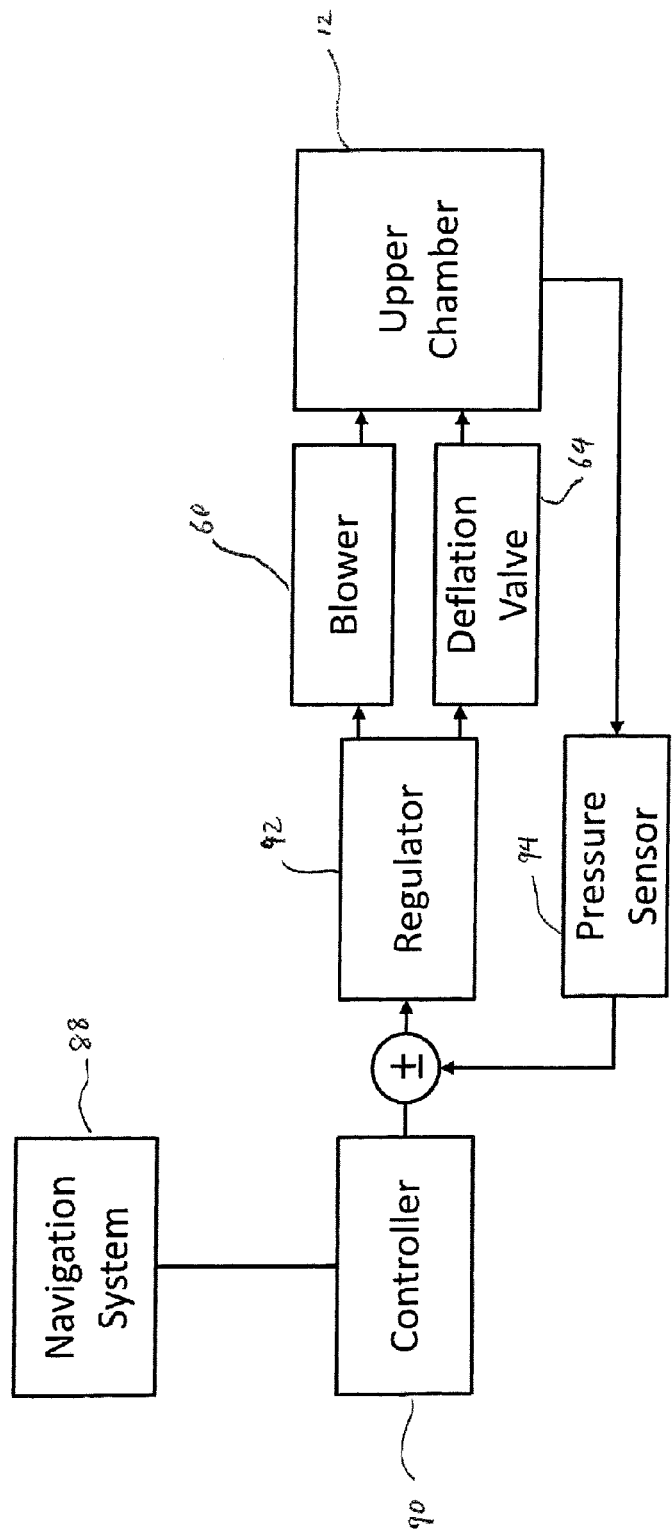
FIG. 10 is a schematic diagram of a dampening system for regulating pressure within the upper air chamber to ensure energy absorption upon air vehicle touchdown (landing).

During landing, a dampening system regulates pressure within the upper air chamber to ensure energy absorption and a safe touchdown. The dampening system also regulates the internal chamber pressure to keep pressure within acceptable structural limits. Referring to FIG. 10, during descent and as a precautionary measure during takeoff, an impact energy dissipater controller 90 uses the vehicle's inertial navigational system 88 to maintain appropriate pressure by opening and closing the internal inflation 68 and deflation 64 air valves. Appropriate pressure levels are maintained by a pressure regulator 92 and a pressure feedback sensor 94.

Referring to FIG. 3, as a backup safety system to prevent overload of the upper air chamber 12, a dampening system may contain safety valves 84 which open when the internal air chamber pressure exceeds the set maximum allowed pressure. The safety valves 84 close when the pressure returns to an acceptable level.

Referring to FIG. 8a, the control system may also contain compressed air reserve tanks 98 used to inflate the load bearing upper chamber during landing in cases where there is a loss of power causing the inflation/deflation air blowers to fail. The compressed air reserves are comprised of lightweight carbon fiber (or other lightweight composite) wrapped tanks filled with compressed air or other gas that may be used to inflate the load bearing chambers.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention, which do not depart from the spirit and scope of the foregoing specification and drawings, and of the claims appended below, are possible and practical. It is intended that the claims cover all such modifications and alternative embodiments.

The invention claimed is:

1. A multi-chamber landing system for use on an air vehicle, comprising:
    an upper air chamber, the air chamber being continuous;
    a lower air chamber, the air chamber being continuous;
    a means for selectively controlling the inflation and deflation of the upper and lower air chambers, wherein the upper and lower air chambers may be independently inflated and deflated;
    a means for creating suction or pressurizing a space defined by the interior walls of the upper and lower air chambers and the ground when the air vehicle is on the ground.

2. The multi-chamber landing system for use on an air vehicle of claim 1, wherein the system controls pressure in the air chambers to adjust the attitude of the vehicle.

3. The multi-chamber landing system for use on an air vehicle of claim 1, wherein the means for inflating the upper and lower air chambers inflates the chambers prior to landing and deflates the chambers upon takeoff.

4. The multi-chamber landing system for use on an air vehicle of claim 1, wherein the air volume of the lower chamber may be adjusted to conform to the ground upon landing.

5. The multi-chamber landing system for use on an air vehicle of claim 1, wherein the means for creating suction or pressurizing the space defined by the interior walls of the upper and lower air chambers and the ground is at least one bi-directional blower.

6. The multi-chamber landing system for use on an air vehicle of claim 1, wherein the upper air chamber is divided into a plurality of separate chambers by interior dividers, wherein if one chamber is punctured, the entirety of the upper chamber will not collapse.

7. The multi-chamber landing system for use on an air vehicle of claim 1, wherein a bottom surface of the lower air chamber is coated with an abrasion resistant coating.

8. The multi-chamber landing system for use on an air vehicle of claim 1, wherein the upper air chamber includes one or more overpressure safety valves that release air to reduce pressure during any event which causes the maximum pressure rating of the upper air chamber to be exceeded.

9. The multi-chamber landing system for use on an air vehicle of claim 1, wherein the means for selectively controlling the inflation and deflation of the upper and lower air chambers, comprises:
    a blower assembly in fluid communication with an external air intake valve, an internal air deflation valve, an internal air inflation valve, an internal air exhaust valve, an upper chamber valve and a lower chamber valve;
    wherein the lower chamber valve is in fluid communication with the lower air chamber and wherein the upper chamber valve is in fluid communication with the upper air chamber;
    wherein, during inflation of the upper and lower chamber, the air intake valve is open, the internal deflation valve is closed, and the internal inflation valve is open and the upper and lower air chambers air valves are open; and
    wherein, during deflation, the external air intake valve is closed, the air deflation valve is open, the internal air exhaust valve is open, and the upper and lower air chamber valves are open.

10. The inflation and deflation system for a multi-chamber landing system having upper and lower air chambers of claim 9, wherein the blower assembly is an engine driven twin screw air pump.

11. The inflation and deflation system for a multi-chamber landing system having upper and lower air chambers of claim 9, wherein the blower assembly is selected from the group comprising: Roots, Paxton, piston, and screw type air pumps.

12. A multi-chamber landing system for use on an air vehicle, comprising:
- an upper air chamber, the air chamber being continuous;
- a lower air chamber, the air chamber being continuous;
- means for actively controlling the inflation and deflation of the upper and lower air chambers, wherein the means for actively controlling the inflation and deflation of the upper and lower air chambers, comprises:
- a blower assembly in fluid communication with an external air intake valve, an internal air deflation valve, an internal air inflation valve, an internal air exhaust valve, an upper chamber valve and a lower chamber valve;
- wherein the lower chamber valve is in fluid communication with the lower air chamber and wherein the upper chamber valve is in fluid communication with the upper air chamber;
- wherein, during inflation of the upper and lower chamber, the air intake valve is open, the internal deflation valve is closed, and the internal inflation valve is open and the upper and lower air chambers air valves are open;
- wherein, during deflation, the external air intake valve is closed, the air deflation valve is open, the internal air exhaust valve is open, and the upper and lower air chamber valves are open; and
- a means for creating suction or pressurizing a space defined by the interior walls of the upper and lower air chambers and the ground when the air vehicle is on the ground.

13. The multi-chamber landing system for use on an air vehicle of claim 12, wherein the system controls pressure in the air chambers to adjust the attitude of the vehicle.

14. The multi-chamber landing system for use on an air vehicle of claim 12, wherein the means for inflating the upper and lower air chambers inflates the chambers prior to landing and deflates the chambers upon takeoff.

15. The multi-chamber landing system for use on an air vehicle of claim 12, wherein the air volume of the lower chamber may be adjusted to conform to the ground upon landing.

16. The multi-chamber landing system for use on an air vehicle of claim 12, wherein the means for creating suction or pressurizing the space defined by the interior walls of the upper and lower air chambers and the ground is at least one bi-directional blower.

17. The multi-chamber landing system for use on an air vehicle of claim 12, wherein the upper air chamber is divided into a plurality of separate chambers by interior dividers, wherein if one chamber is punctured, the entirety of the upper chamber will not collapse.

18. The multi-chamber landing system for use on an air vehicle of claim 12, wherein a bottom surface of the lower air chamber is coated with an abrasion resistant coating.

19. The multi-chamber landing system for use on an air vehicle of claim 12, wherein the upper air chamber includes one or more overpressure safety valves that release air to reduce pressure during any event which causes the maximum pressure rating of the upper air chamber to be exceeded.

20. The inflation and deflation system for a multi-chamber landing system having upper and lower air chambers of claim 12, wherein the blower assembly is an engine driven twin screw air pump.

21. The inflation and deflation system for a multi-chamber landing system having upper and lower air chambers of claim 12, wherein the blower assembly is selected from the group comprising: Roots, Paxton, piston, and screw type air pumps.

* * * * *